United States Patent [19]

Hashimoto et al.

[11] 4,114,491

[45] Sep. 19, 1978

[54] FULL ROTATION TYPE PAPER WEB CUTTING DEVICE

[75] Inventors: Yoshitoshi Hashimoto; Takajiro Kondo, both of Yasugi; Toshitaka Asamoto, Matsue, all of Japan

[73] Assignee: Hitachi Metals, Ltd., Japan

[21] Appl. No.: 870,071

[22] Filed: Jan. 17, 1978

Related U.S. Application Data

[62] Division of Ser. No. 613,499, Sep. 15, 1975, abandoned.

[30] Foreign Application Priority Data

Sep. 24, 1974 [JP] Japan ................................ 49-108754

Aug. 20, 1975 [JP] Japan ................................ 50-113801

[51] Int. Cl.² .......................... B26D 1/56; B23D 25/08

[52] U.S. Cl. ........................................ 83/341; 83/349; 83/583; 83/596; 83/674; 83/694

[58] Field of Search ................. 83/340, 341, 342, 348, 83/349, 583, 596, 674, 694, 334

[56] References Cited

U.S. PATENT DOCUMENTS 3,322,012 5/1967 Murray .................................. 83/341

3,733,949 5/1973 Bradley .................................. 83/349

3,812,753 5/1974 Kiejzik .............................. 83/583 X

FOREIGN PATENT DOCUMENTS 233,149 10/1944 Switzerland .............................. 83/348

*Primary Examiner*—Willie G. Abercrombie

*Attorney, Agent, or Firm*—Craig & Antonelli

[57] ABSTRACT

A paper web cutting device of a full rotation type comprises, in combination: a rotary cutter including a shank with rotary shafts at both ends, a cutting blade affixed to the shank, with its edge inclined circumferentially relative to the common axis of the shafts, a guide ring located at the cutting starting end of the blade and having a radius of rotation equal to that of the edge, and a second guide member located at the cutting terminating end of the blade and having a volute configuration, with its radius of rotation gradually decreased from the initial value equal to the radius of rotation of the edge; and a stationary cutter having a straight edge and supported in place by pivot pins at both ends, in such a manner that, at the cutting terminating end, the edge is graded to interfere slightly with the radius of rotation of the rotary cutter edge, the edge being forced by a spring to bear against the rotary cutter.

1 Claim, 6 Drawing Figures

FULL ROTATION TYPE PAPER WEB CUTTING DEVICE

CROSS REFERENCE TO RELATED APPLICATIONS

This application is a divisional application of U.S. application Ser. No. 613,499, filed on Sept. 15, 1975, now abandoned.

BACKGROUND OF THE INVENTION

This invention relates to a device for cutting a moving web of paper for use with a copying machine, facsimile or the like.

A rotary type cutting device as illustrated in FIGS. 1 and 2 has hitherto been described in the above-mentioned patent application Ser. No. 613,499 for such purposes. In order for the device of the construction shown to cut the web positively, its rotary blade 2 and stationary blade 3 should be machined and assembled to very close tolerances. Since the web 1 is usually about 0.076 mm (0.003 inch) thick, the clearance between the edges of the two blades must be kept within a very small range. Moreover, this clearance is directly affected by the wear of the edges with use. The cutting device of the type, therefore, is generally regarded as a device of short life.

SUMMARY OF THE INVENTION

It is an object of the present invention to provide a cutting device capable of accomplishing positive web cutting by means of cutters machined and assembled with relatively low accuracy.

Another object of the invention is to provide a device which produces only limited noise during operation.

Yet another object of the invention is to provide a device having an adequately long service life as compared with the existing devices of this character.

Thus, the present invention pertains to a cutting device which comprises: a rotary cutter including a shank or rotary body with rotary shafts at both ends, a cutting blade affixed to the shank, with its edge formed inclined to the axis of the rotary shafts at the circumference or periphery of the rotary body relative to the common axis of the shafts, a guide ring located at the cutting starting end of the blade and having a radius of rotation equal to that of the rotary cutting edge, and a second guide member located at the cutting terminating end of the blade and having a volute configuration, with its radius of rotation gradually decreased from the initial value equal to the radius of rotation of the edge; and a stationary cutter having a straight edge and supported in place by pivot pins at both ends, in such a manner that, at the cutting terminating end, the staight edge is inclined to interfere slightly with the radius of rotation of the rotary cutter edge, the straight cutting edge being forced by spring means to bear against the rotary cutter.

DETAILED DESCRIPTION OF THE INVENTION

Figure 1:
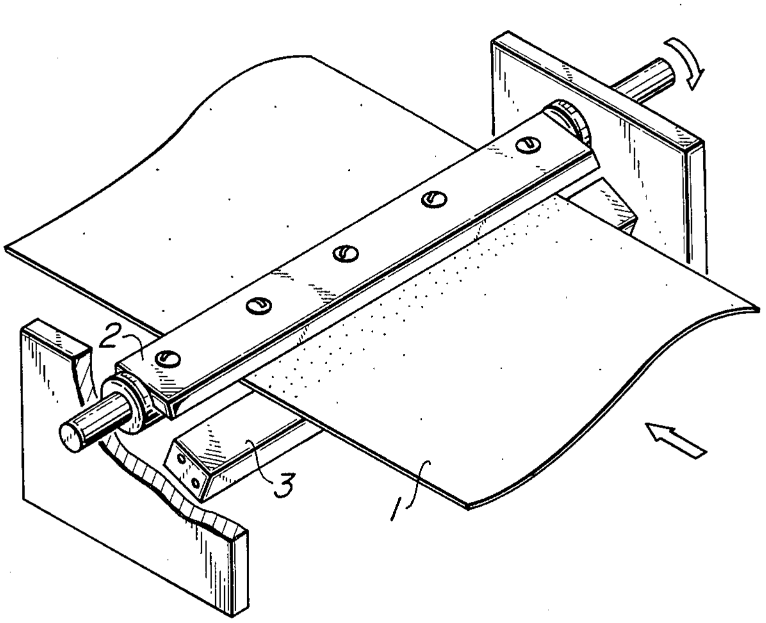
FIG. 1 is a perspective view of a cutting device described in the patent application Ser. No. 613,499.
Figure 2:
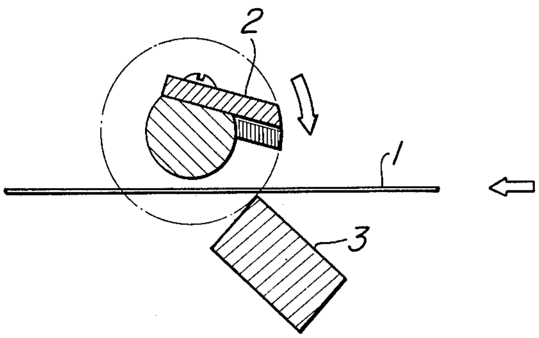
FIG. 2 is a cross sectional view of the device illustrated in FIG. 1.
Figure 3:
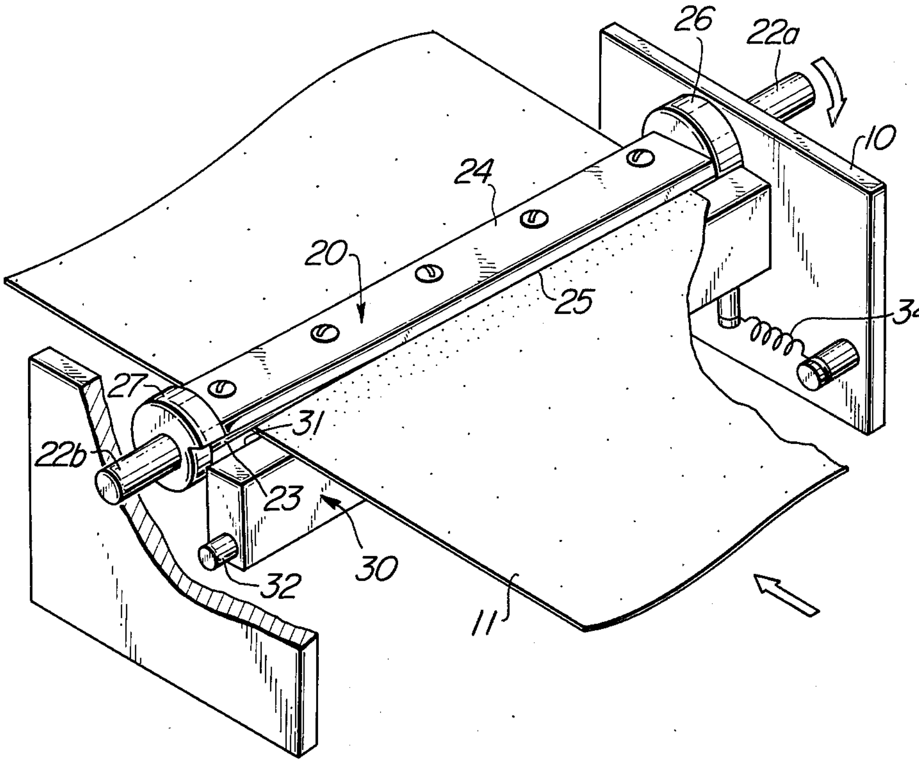
FIG. 3 is a perspective view of a cutting device embodying the present invention.
Figure 4:
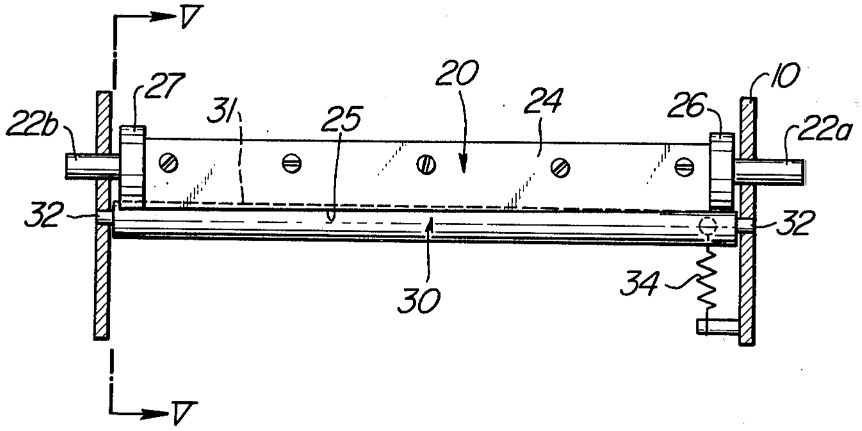
FIG. 4 is a top view of the device illustrated in FIG. 3.
Figure 5:
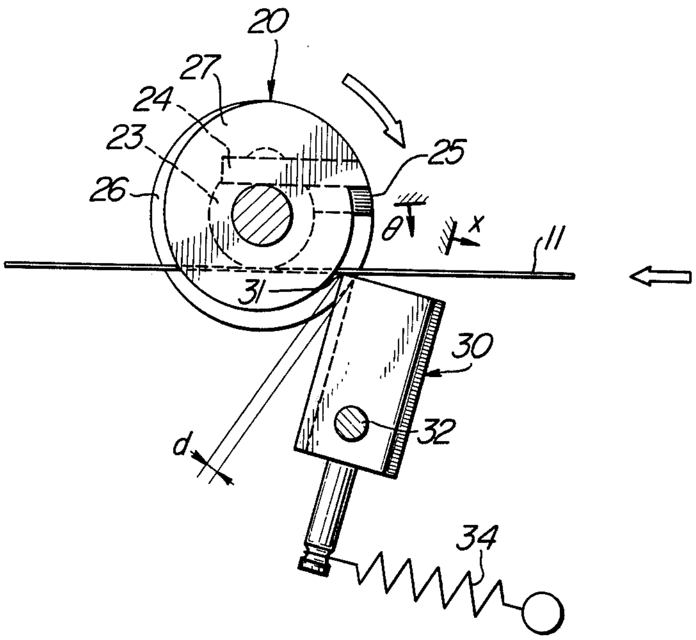
FIG. 5 is a cross sectional view taken along line V—V of FIG. 4.

Referring to FIGS. 3, 4 and 5, there is illustrated a full rotation type paper web cutting device that is durable and capable of cutting a moving web of paper 11 by cutters 20 and 30 machined and assembled to relatively moderate tolerances.

One of the cutters, a rotary one 20, comprises a shank 23 with shafts *22a, 22b* at both ends, and a rotary blade 24 affixed to the shank 23, with its edge 25 included circumferentially relative to the common axis of the shafts *22a, 22b*.

Adjacent to the advancing end of the edge 25 where cutting starts, a guide ring 26 having a radius of rotation equal to that of the edge 25 is affixed to the rotary cutter 20. Adjacent to the opposite end of the edge 25 where cutting terminates, a second guide member 27 of a volute configuration, with its radius of rotation gradually decreased from the initial value equal to the radius of rotation of the edge 25, is affixed to the rotary cutter 20.

Referring to FIG. 4, the other cutter 30 which is stationary and having a straight edge 31 is supported in place with pivot pins 32 at both ends. It is urged by a spring 34 so that the edge 31 bears against the rotary cutter 20.

Prior to the start of cutting operation, the edge 31 of the stationary cutter 30 is in contact with the guide ring 26 of the rotary cutter 20. At the cutting terminating end, the edge 31 is inclined so as to interfere slightly with the radius of rotation of the rotary cutter edge 25.

The amount of interference *d* usually ranges from about one-two thousandth to about one-five hundredth of the overall length of the cutter.

With the construction described, the cutting device operates in the following way. The rotary cutter 20 is connected to a drive, such as an electric motor (not shown), through the shaft *22a* or *22b*, and it makes one revolution for each cutting cycle.

As the rotary cutter 20 starts to work, the guide ring 26 having the same radius of rotation as the edge 25 of the rotary blade 24 begins to bring the edge smoothly into engagement with the edge 31 of the stationary cutter 30.

The web 11 is cut across, from one web edge toward the other, according to the circumferential slant of the rotary blade 24 relative to the common axis of the shafts *22a, 22b*. At the same time, because of its radial inclination, the stationary cutter 30 moves a little away from the rotary cutter 20.

The slanting of edge lines allows the both edges during cutting operation to meet sequentially always at one point where they directly take part in cutting. Positive cutting is thus obtained regardless of errors in the cylindricity of the edge 25 of the rotary blade 24 and in the straightness of the edge 31 of the stationary cutter 30, and also despite some wear of these edges.

Upon completion of cutting, the stationary cutter 30 is in a position retracted from the precutting position by a distance equivalent to the amount of interference *d*, and is in contact with the second guide member 27.

With further rotation of the rotary cutter 20, the stationary cutter 30 in sliding contact with the second guide member 27 according to its configuration is smoothly brought back to the initial cutting position.

Figure 6:
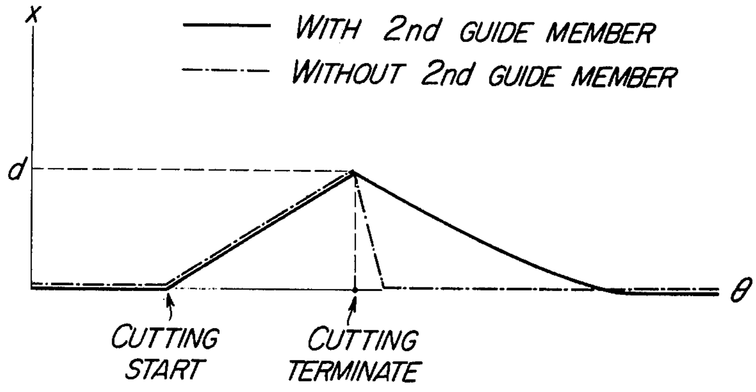
FIG. 6 is a schematic illustration of the relation between the rotation of the rotary blade and the displacement of the stationary blade.

The relation between the rotation $\theta$ of the rotary cutter 20 and the displacement $x$ of the stationary cutter is graphically illustrated in FIG. 6, wherein the displacement $x$ indicates two comparative cases, with the second guide member 27 (solid line) and without (chain line).

In the absence of the second guide member 27, the stationary cutter 30 would be strikingly reset to the initial cutting position by the spring 34 as soon as the cutting is done. The guide ring 26 and the opposed edge portion of the stationary cutter 30 would give an impact noise and tend to wear prematurely, rendering smooth operation difficult.

The second guide member 27 serves to bring back the stationary cutter 30 gently to the original position.

What is claimed is:

1. A device for cutting a moving web of paper which comprises: a shank having rotary shafts at both ends, a rotary blade affixed to said shank with its edge formed inclined circumferentially relative to the common axis of said shafts, a guide ring located adjacent to the cutting starting end of said blade and having a radius of rotation equal to that of said edge, a second guide member located adjacent to the cutting terminating end of said blade and having a volute configuration with its radius of rotation gradually decreased from the initial value equal to the radius of rotation of said edge, a stationary cutter having a straight edge and supported in place by pivot pins at both ends, said cutter being disposed in such a manner that, at the cutting terminating end, it is inclined to interfere with said rotary blade radially relative to the common axis of said shafts of said rotary blade, and a spring for forcing said edge of said stationary cutter to bear against said rotary blade.

* * * * *